United States Patent
Burton et al.

(10) Patent No.: US 6,633,962 B1
(45) Date of Patent: Oct. 14, 2003

(54) METHOD, SYSTEM, PROGRAM, AND DATA STRUCTURES FOR RESTRICTING HOST ACCESS TO A STORAGE SPACE

(75) Inventors: David Alan Burton, Vail, AZ (US); Robert Louis Morton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/531,932

(22) Filed: Mar. 21, 2000

(51) Int. Cl.[7] .............................................. G06F 12/00
(52) U.S. Cl. ..................... 711/163; 711/170; 711/152
(58) Field of Search ............................... 711/163, 112, 711/114, 170, 173, 152, 202; 713/200, 201; 709/229, 226; 707/9

(56) References Cited

U.S. PATENT DOCUMENTS

| | | | | |
|---|---|---|---|---|
| 5,301,297 A | * | 4/1994 | Menon | 711/114 |
| 5,414,851 A | | 5/1995 | Brice, Jr. et al. | 709/104 |
| 5,604,890 A | | 2/1997 | Miller | 703/23 |
| 5,774,698 A | | 6/1998 | Olnowich | 712/1 |
| 5,784,377 A | | 7/1998 | Baydar et al. | 370/463 |
| 6,260,120 B1 | * | 7/2001 | Blumenau | 711/152 |
| 6,295,575 B1 | * | 9/2001 | Blumenau | 711/5 |
| 6,311,255 B1 | * | 10/2001 | Sadana | 711/152 |
| 6,314,501 B1 | * | 11/2001 | Gulick | 711/153 |
| 6,321,314 B1 | * | 11/2001 | Van Dyke | 711/163 |

* cited by examiner

Primary Examiner—Kimberly N McLean-Mayo
(74) Attorney, Agent, or Firm—David W. Victor; Konrad Raynes Victor & Mann LLP

(57) ABSTRACT

A method, system, program, and data structure for restricting host access to at least one logical device. Each logical device comprises a section of physical storage space that is non-overlapping with the physical storage space associated with other logical devices. At least one logical device and at least one host are assigned to a cluster group. A cluster group is defined such that hosts that are not in a particular cluster group cannot access the logical devices that are assigned to the cluster group. Further, within each cluster group, a logical number is assigned to each logical device in the cluster group such that no host member of that cluster group uses the assigned logical number to access another logical device. The hosts in the cluster group use the logical number to access the logical device to which the logical number is assigned.

31 Claims, 14 Drawing Sheets

500

| Logical Disk No. | LUN No. | Cluster Group No. |
|---|---|---|
| 0 | FFFF | NULL |
| 1 | FFFF | NULL |
| 2 | FFFF | NULL |
| 3 | FFFF | NULL |

| LUN No. | Logical Disk No. | Cluster Group No. |
|---|---|---|
| 0 | FFFF | NULL |
| 1 | FFFF | NULL |
| 2 | FFFF | NULL |
| 3 | FFFF | NULL |

Master Logical Disk List

| Logical Disk No. | LUN No. | Cluster Group No. |
|---|---|---|
| 0 | 0 | CG0 |
| 1 | FFFF | NULL |
| 2 | FFFF | NULL |
| 3 | FFFF | NULL |

Public LUN Map

| LUN No. | Logical Disk No. | Cluster Group No. |
|---|---|---|
| 0 | FFFF | NULL |
| 1 | FFFF | NULL |
| 2 | FFFF | NULL |
| 3 | FFFF | NULL |

512

Host 0 LUN Map

| LUN No. | Logical Disk No. | Cluster Group No. |
|---|---|---|
| 0 | 0 | CG0 |
| 1 | FFFF | NULL |
| 2 | FFFF | NULL |
| 3 | FFFF | NULL |

514

Master Logical Disk List (520)

| Logical Disk No. | LUN No. | Cluster Group No. |
|---|---|---|
| 0 | 0 | CG0 |
| 1 | 0 | CG1 |
| 2 | 1 | CG1 |
| 3 | FFFF | NULL |

Public LUN Map (522)

| LUN No. | Logical Disk No. | Cluster Group No. |
|---|---|---|
| 0 | FFFF | NULL |
| 1 | FFFF | NULL |
| 2 | FFFF | NULL |
| 3 | FFFF | NULL |

Host 0 LUN Map (524)

| LUN No. | Logical Disk No. | Cluster Group No. |
|---|---|---|
| 0 | 0 | CG0 |
| 1 | FFFF | NULL |
| 2 | FFFF | NULL |
| 3 | FFFF | NULL |

Host 1 LUN Map (526)

| LUN No. | Logical Disk No. | Cluster Group No. |
|---|---|---|
| 0 | 1 | CG1 |
| 1 | 2 | CG1 |
| 2 | FFFF | NULL |
| 3 | FFFF | NULL |

Fig. 12

Public LUN Map (542)

| LUN No. | Logical Disk No. | Cluster Group No. |
|---|---|---|
| 0 | FFFF | NULL |
| 1 | FFFF | NULL |
| 2 | FFFF | NULL |
| 3 | 1 | NULL |

Host 1 LUN Map (546)

| LUN No. | Logical Disk No. | Cluster Group No. |
|---|---|---|
| 0 | FFFF | NULL |
| 1 | 2 | CG1 |
| 2 | FFFF | NULL |
| 3 | 1 | NULL |

Master Logical Disk List (540)

| Logical Disk No. | LUN No. | Cluster Group No. |
|---|---|---|
| 0 | 0 | CG0 |
| 1 | 3 | NULL |
| 2 | 1 | CG1 |
| 3 | 2 | CG0 |

Host 0 LUN Map (544)

| LUN No. | Logical Disk No. | Cluster Group No. |
|---|---|---|
| 0 | 0 | CG0 |
| 1 | FFFF | NULL |
| 2 | 3 | CG0 |
| 3 | 1 | NULL |

Fig. 14

METHOD, SYSTEM, PROGRAM, AND DATA STRUCTURES FOR RESTRICTING HOST ACCESS TO A STORAGE SPACE

BACKGROUND OF THE INVENTION

1. Field of the Invention

The present invention relates to a system, method, program, and data structures for restricting host access to storage space.

2. Description of the Related Art

In prior art storage systems, one or more host computers access a storage space, such as one or more Direct Access Storage Devices (DASDs), comprising interconnected hard disk drives, through a storage controller. The storage controller manages the flow of data from host systems to DASDs managed by the storage controller. Host systems view the physical storage space as a partition of Logical Unit Numbers (LUNs). The host will access a particular LUN, and the storage controller will translate the LUN identifier to a logical disk that maps to one or more physical disks, e.g., hard disk drives. The storage controller uses the logical disk to map directly to a storage device or DASD. In RAID array systems where data is stripped across multiple hard disk drives, the storage controller will perform additional mapping to determine the location in the RAID array of a particular logical disk. In this way, the storage controller views actual physical storage as one or more logical disks or logical devices.

Many large scale networks may include heterogenous systems, or systems that have incompatible operating systems. For instance, some hosts may operate with the Microsoft Windows NT operating systems, others with the IBM AIX, OS/390, or MVS operating systems, etc.** In such heterogenous systems, host with non-compatible operating systems must boot from separate LUNs. In prior art systems,segregation of heterogeneous systems is accomplish by providing multiple storage controllers and DASD subsystems, and by restricting host access to a particular storage controller and DASD based on the host operating system. Thus, all Windows NT hosts will share one storage controller and all IBM AIX hosts will share another storage controller to avoid any conflicts.

**Windows and NT are registered trademarks of Micosoft Corporation; AIX and OS/390 are registered trademarks of IBM and MVS and Fibre Channel Raid Storage Controller are trademarks of IBM.

One reason for using multiple storage controllers when hosts have heterogeneous operating systems is that each operating system typically uses LUN 0 as the boot LUN. Thus, to allow hosts having heterogeneous operating systems to use LUN 0, the hosts must be directed to a storage controller that provides LUN 0 as the bootable disk for that operating system.

The problem with the above approach is that it substantially increases the cost of the storage subsystem because redundant storage controllers and DASDs must be provided for the number of non-compatible operating systems used by hosts in the network. Such redundancy would have to be provided to accommodate heterogenous hosts even if the storage space and performance of a single storage controller and storage subsystem is sufficient to accommodate the storage needs of the entire heterogeneous system. Such unnecessary redundancy may increase the costs of the system substantially while only providing minimal improvements in performance.

Thus, there is a need in the art to provide improved methods for allowing hosts to access a storage subsystem and assign LUNs to hosts to avoid any conflicts.

SUMMARY OF THE PREFERRED EMBODIMENTS

To overcome the limitations in the prior art described above, preferred embodiments disclose a method, system, program, and data structures for restricting host access to at least one logical device. Each logical device comprises a section of physical storage space that is non-overlapping with the physical storage space associated with other logical devices. At least one logical device and at least one host are assigned to a cluster group. A cluster group is defined such that hosts that are not in a particular cluster group cannot access the logical devices that are assigned to the cluster group. Further, within each cluster group, a logical number is assigned to each logical device in the cluster group such that no host member of that cluster group uses the assigned logical number to access another logical device. The hosts in the cluster group use the logical number to access the logical device to which the logical number is assigned.

In further embodiments, an access request is received including as parameters one input logical number from one host. A determination is made as to whether the host is capable of accessing one logical device associated with the input logical number. The host is permitted access to the logical device associated with the logical number if there is a logical device associated with the input logical number.

In yet further embodiments, a host list indicates all available hosts. All hosts in the host list can access a logical device assigned one logical number and not assigned to a cluster group. For each host in the host list, there is a host map indicating each logical number accessible to the host. A request is received including as parameters one input logical device and input cluster group to add the input logical device to the input cluster group. A determination is then made as to whether the input logical device is accessible to all hosts. The host map for each host that is not assigned to the input cluster group is updated to indicate that the input logical device is not accessible if the input logical device is accessible to all hosts.

In further embodiments, when receiving a request to add the input logical device to the input logical cluster, a determination is made as to whether the input logical device is not assigned one logical number. If the input logical device is not assigned one logical number, then a determination is made of one logical number that is not used by any host in the input cluster group to access one logical device. The determined logical number is assigned to the input logical device and the host map for each host that is assigned to the input cluster group is updated to indicate that the determined logical number is assigned to the input logical device. After updating the host maps, each host in the input cluster group can use the determined logical number to access the input logical device.

In even further embodiments, a request is received including as parameters one input logical device to make accessible to all hosts in the host list. A determination is made of one cluster group including the input logical device. A determination is also made of the logical number for the input logical device and of any host that is not in the determined cluster group that uses the determined logical number to access another logical device. If no other host that is not in the determined cluster group uses the determined logical number, then the host map for each host in the host list is updated to indicate that the determined logical number is assigned to the input logical device. After updating the host maps, all the hosts in the host list can use the determined logical number to access the input logical device. Otherwise, if at least one host that is not in the determined cluster group uses the determined logical number, then a determination is made of one unused logical number that is not used by any host in the host list to access one logical device. In such case, the host map for each host in the host list is updated to indicate that the determined unused logical number is assigned to the input logical device. All the hosts in the host list can use the determined unused logical number to access the input logical device.

Preferred embodiments provide a technique for restricting host access to particular logical devices, such as physical disks, in a storage system. This technique assigns restricted logical devices to cluster groups so that only hosts assigned to the cluster group can access the logical device assigned to the cluster group. Preferred embodiments further provide mechanisms for reusing logical numbers that hosts use to access logical disks in a manner that ensures that within any one cluster group, no logical number would map to multiple logical disks. However, the same logical number may be concurrently used among cluster groups as long as no single host could use a logical number to access two different logical disks as this is an invalid state.

A single storage controller implementing the preferred embodiment technique for restricting host access to particular logical numbers can allow heterogeneous hosts access to the storage device, but restrict homogeneous groups of hosts to their own logical devices in the storage space by forming cluster groups of homogeneous hosts. This would preclude a host from accessing a cluster group and the storage space associated with the cluster group that is used by other incompatible hosts. Further, with the use of cluster groups, hosts with different operating systems can all use LUN 0 as the boot disk as long as those hosts with different operating systems are assigned to separate cluster groups, i.e., hosts are assigned to cluster groups based on the operating system they use. This would prevent a host from using the LUN 0 boot disk associated with a different operating system.

BRIEF DESCRIPTION OF THE DRAWINGS

Referring now to the drawings in which like reference numbers represent corresponding parts throughout:

FIGS. 10–14 illustrate examples of the data structures used to manage the assignment of hosts and logical devices to cluster groups.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
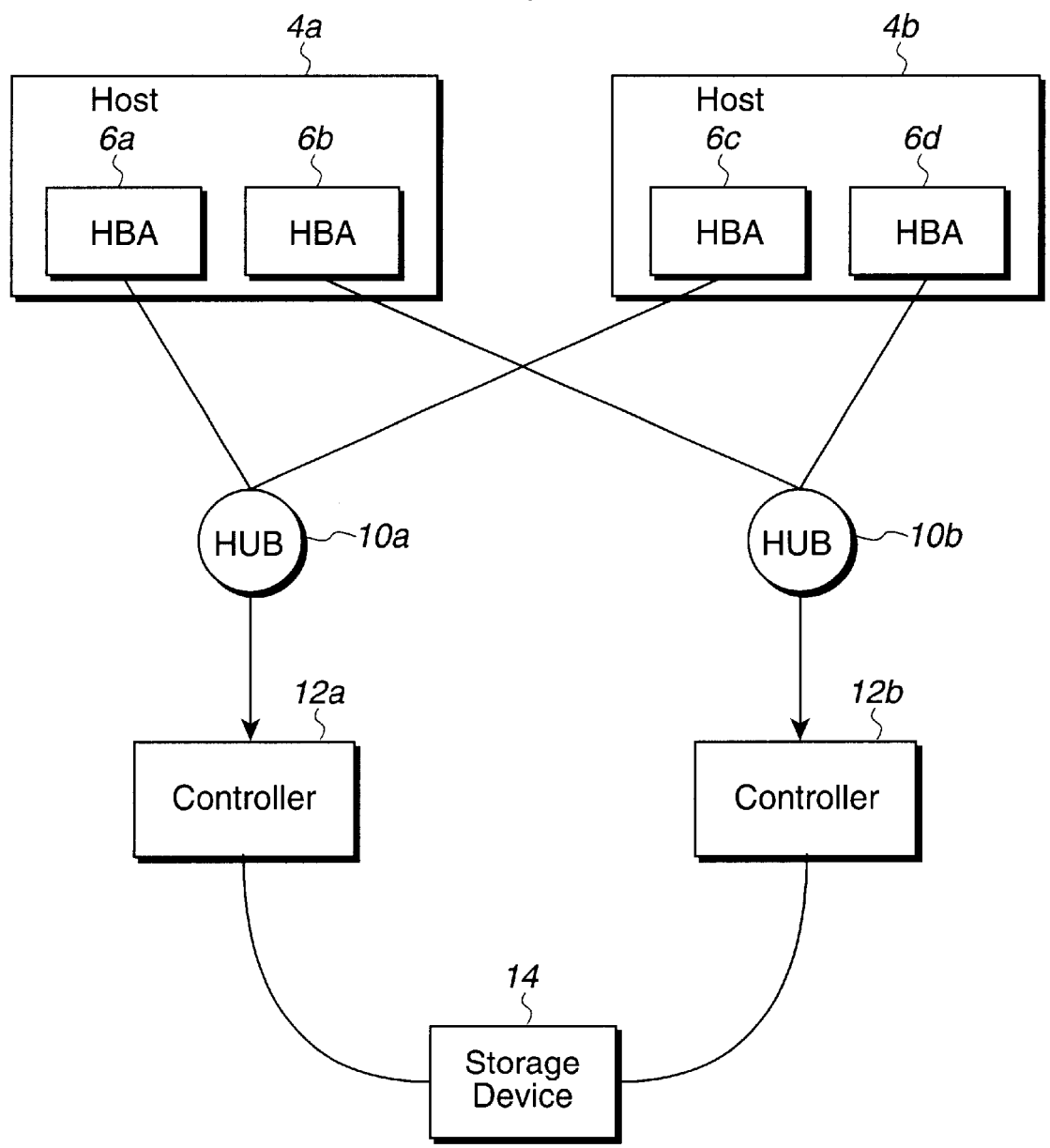
FIG. 1 is a block diagram illustrating a computing environment in which preferred embodiments are implemented.

FIG. 1 illustrates a computing environment in which preferred embodiments are implemented. Hosts 4a, b may comprise any computing device known in the art, including servers through which other client computers can access storage or clients or, alternatively, computers that do not function as servers, including desktop, mainframe, workstation, hand held and any other type of computing device. The hosts 4a, b each include two host bus adaptors (HBAs) 6a, b and 6c, d, respectively. The HBAs 6a, b, c, d may comprise a Fibre Channel adaptor card or any other network adaptor card known in the art. The HBAs 6a, b, c, d allow the hosts 4a, b to communicate with storage controllers 12a, b via the hubs 10a, b. The hubs 10a, b may comprise the IBM Fibre Channel Storage Hub or Switch, the IBM SAN Fibre Channel Switch, or any other switching device known in the art. The controllers 12a, b control access to a storage device 14, such as a DASD. In preferred implementations, both controllers 12a, b can access any storage location in the storage device 14. The controllers 12a, b may comprise the IBM Fibre Channel Raid Storage Controller or any other storage controller that provides one or more hosts access to a single storage space.

In alternative embodiments, multiple hosts may connect to a single storage controller that provides access to a storage subsystem such as a DASD. Storage controllers that provide access to multiple hosts include high end storage controllers, such as the IBM 3990, 7133, and Enterprise Storage Server storage controller products. Thus, the term "storage controller" as used herein refers to any storage controller, storage server, control unit, or any other computing device that manages input/output (I/O) requests from multiple host systems or a storage control system comprised of two server controllers that together function to provide multiple host systems access to a single storage space.

Still further, in alternative embodiments, the host computers may communicate with one or more storage controllers through any communication interface known in the art, and are not necessarily limited to the host bust adaptor shown in FIG. 1.

In heterogeneous systems including hosts using different operating system platforms, the storage controllers must provide a mechanism to restrict hosts having the same operating system to particular logical drives. A logical drive comprises a particular physical partition of the storage space. Restricting host access is especially important when hosts want to boot from a certain logical drive. In such case, hosts should not be allowed to access the boot logical disk used by hosts including a non-compatible operating system. Preferred embodiments provide a method, system, program and data structures for restricting hosts to specific logical drives. A set of one or more logical drives to which a set of hosts has restricted access is referred to herein as a cluster group.

As discussed, the storage controller maintains a mapping of a LUN number to a logical disk number, which is the storage controller view of the storage device. The LUN number is the host view of the storage subsystem. In preferred embodiments, a cluster group can include zero or more logical disks and zero or more hosts can be associated with a cluster group. If a logical disk is assigned to a cluster group, then only those hosts also assigned to the cluster group can access such logical disk. If a logical disk is not assigned to any cluster group, then it is public and any host can have access. Any logical disk can be in zero or one cluster group and a host can be in zero or more cluster groups. In this way, specific logical disks can be restricted to certain host systems, such as host systems having the same operating system platform by assigning the hosts and logical disks to the same cluster group. Thus, the preferred embodiment cluster group implementation allows one storage controller to provide multiple heterogeneous hosts access to specified logical disks and at the same time restrict host access to certain logical disks to avoid incompatibility errors. Preferred embodiments may also be used to restrict access for security reasons.

Figure 2:
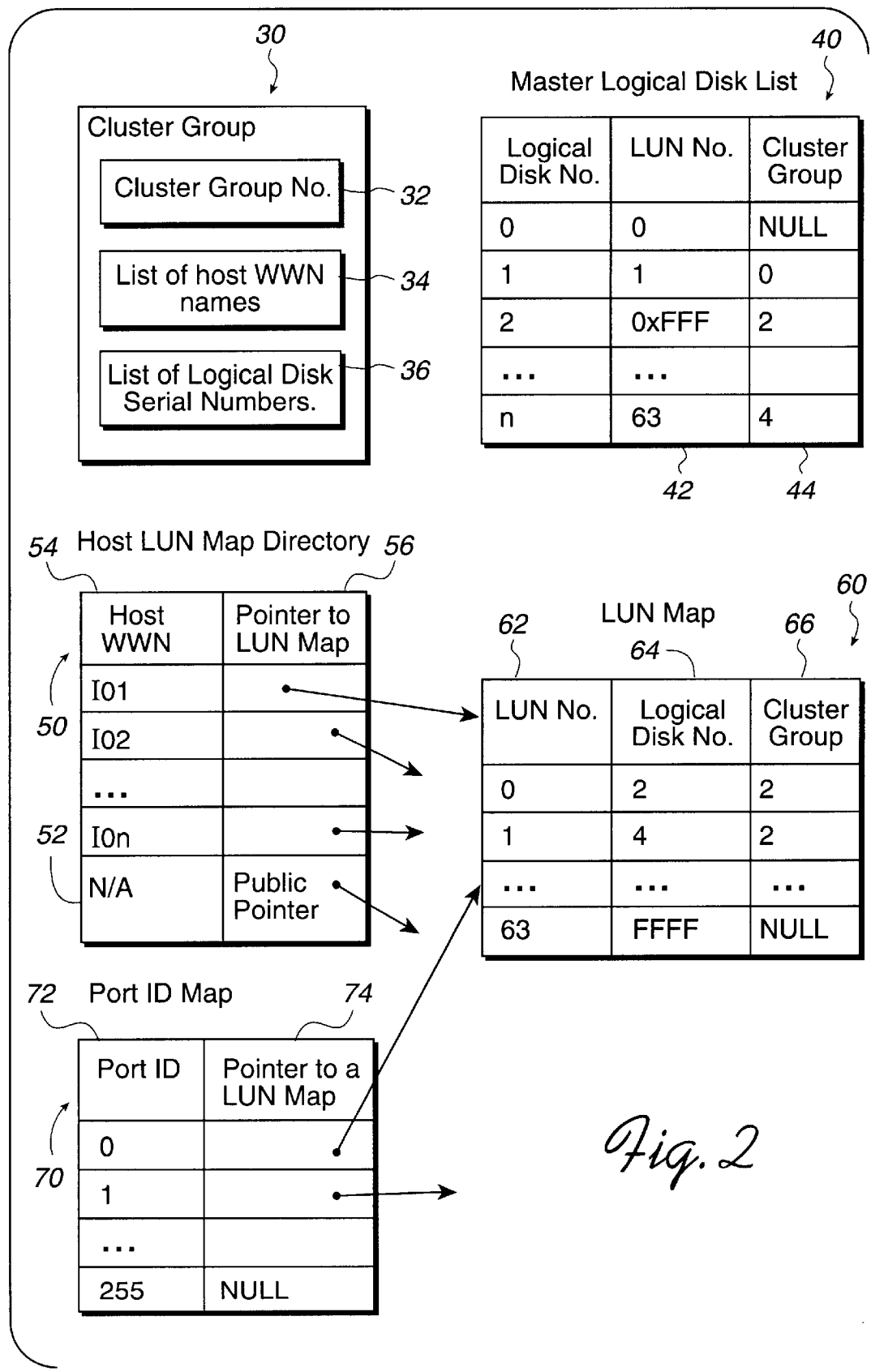
FIG. 2 illustrates data structures used to restrict host access to particular logical disks in accordance with preferred embodiments of the present invention.

To update and manage cluster groups, in preferred embodiments, the storage controller manipulates the following data structures illustrated in FIG. 2, a cluster group 30, a master logical disk list 40, a host LUN map directory 50, a LUN Map 60, and a port ID map 70. For each cluster group created in the system, there is a corresponding cluster group object 30 identified by the cluster group number 32. A cluster group object 30 includes a list 34 of host world wide names that have access to the logical disks associated with the cluster group number 32. A host world wide name is a unique identifier of the host, such as an eight byte unique identifier. The cluster group object 30 further includes a list 36 of logical disk numbers that are assigned to the specific cluster group number 32. Thus, a cluster group object 30 for a cluster group number 32 identifies all logical disks assigned to the cluster group and all the hosts that may access those assigned logical disks. Hosts outside of a cluster group cannot access logical disks within the cluster group.

The master logical disk list 40 includes an entry for every logical disk in the storage device 14. For each logical disk, the list 40 indicates an assigned LUN number 42. If there is no LUN number assigned to the logical disk, then the LUN number 42 is set to invalid (e.g., 0×FFFF). The master logical disk list 40 further indicates for each logical disk a reference to cluster group ID 44 to which the logical disk is assigned. If the logical disk is not associated with a cluster group, then the cluster group ID 44 reference is set to invalid (e.g., NULL).

The storage controller further maintains a host LUN map directory 50 that includes an entry 54 for every host in the system, identified by the WWN. For each host entry, the host LUN map directory 50 includes a pointer 56 to a LUN map 60. Thus, there is one LUN map 60i for each host i in the system listed in the host LUN map directory 50. The LUN map 60 includes an entry for each possible LUN number 62 in the system. For each LUN number entry, the LUN map 60 provides a logical disk number 64 that maps to that LUN number and a cluster group number 66 to which the logical disk number in the logical disk number entry is assigned. If a LUN number is not assigned to a logical disk, then the logical disk number will be set to invalid, e.g., FFFF, and the cluster group number will also be invalid. The LUN map directory 50 also includes a public entry 52 that points to a public LUN map 60p that includes LUN numbers and their corresponding logical disk numbers that are public, i.e., any host can access.

The port ID map 70 includes an entry 72 for each possible port in the storage controller through which a host may connect to the storage controller. When a host logs onto the storage controller, the host logs on through a port. The storage controller would then update the pointer 74 for that port ID entry onto which the host i logged-on to point to the LUN map 60i for host i. The storage controller would use the port ID map 70 to determine whether host i can access a LUN by first determining the LUN map 60i for host i from the pointer 74 for the host i entry in the port ID map 70. If the entry for the requested LUN in the LUN map 60i is valid, then the host i may access the requested LUN.

Figure 3:
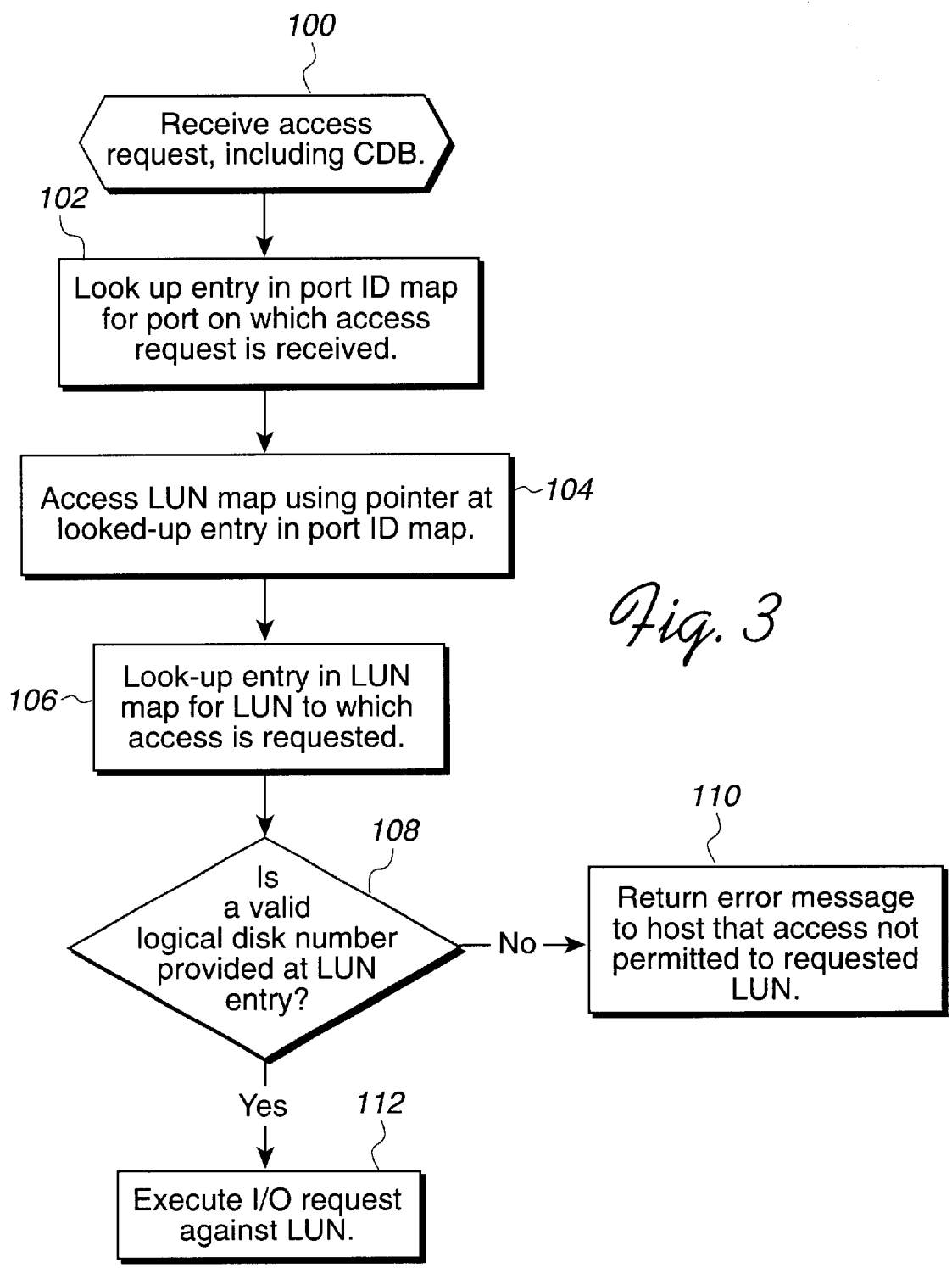
FIG. 3 illustrates logic implemented in a storage controller to control host access to logical devices.
Figure 4:
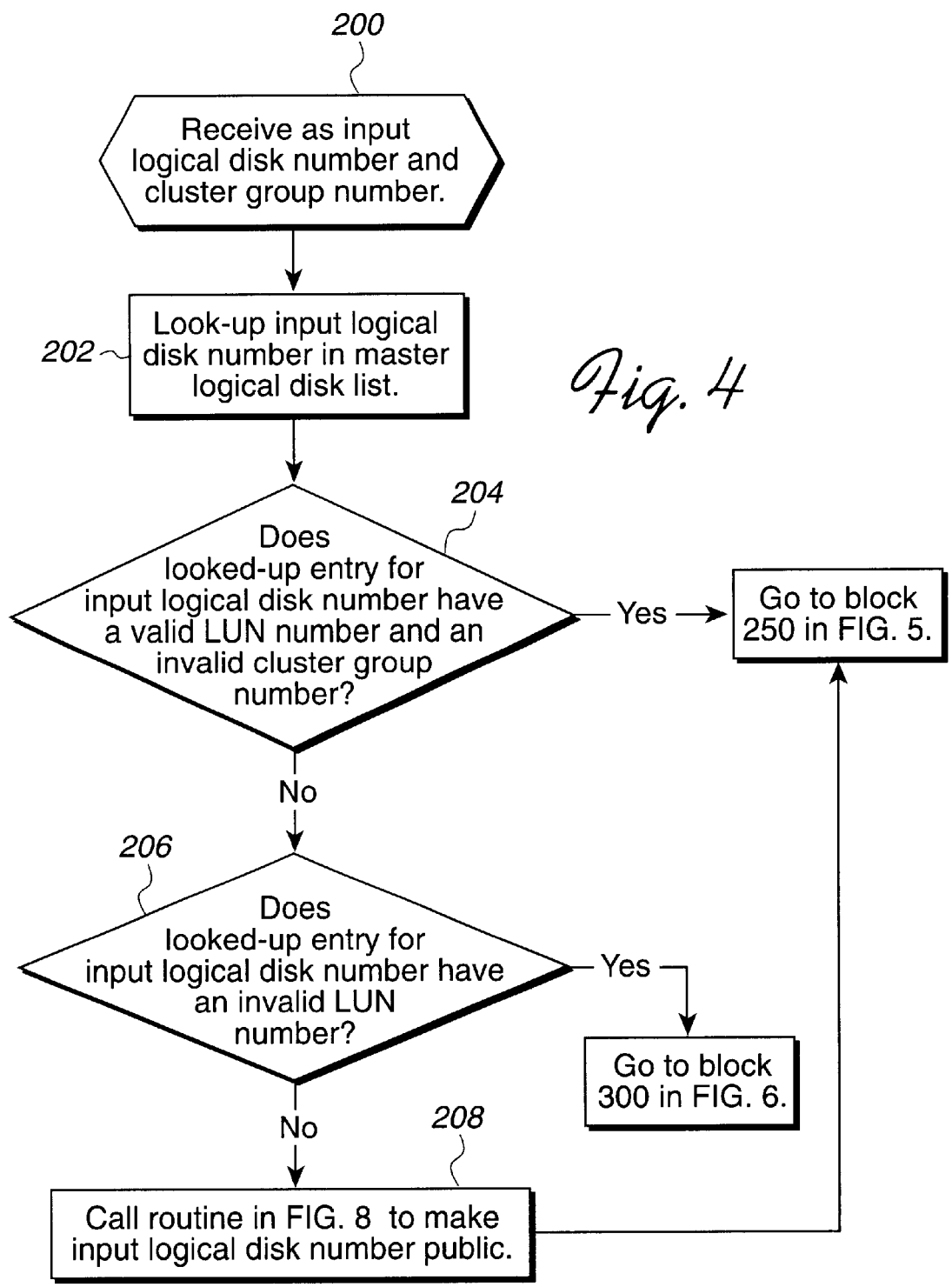
FIGS. 4–9 illustrate logic implemented in a storage controller to add or remove logical devices to a cluster group.

FIG. 3 illustrates logic implemented in the storage controller to process host I/O requests in a Small Computer system Interface (SCSI) format. Control begins at block 100 with the storage controller receiving an I/O request from a host indicating a LUN number to which the request is directed. For instance, a SCSI read/write command includes a command descriptor block (CDB) indicating the LUN number, a logical block address (LBA) within the LUN at which the I/O request begins, and a transfer length of the number of blocks involved in the access request. Note that in alternative non-SCSI embodiments, the I/O request may be in a different format, such as the count-key-data (CKD) I/O request format. The storage controller then looks-up (at block 102) the port ID entry in the port ID map 70 for the port on which the host transmitted the I/O request. As discussed, hosts access the storage controller during a session in which they are assigned a port. The storage controller then accesses (at block 104) the LUN map 60i pointed to by the pointer in the pointer field 56 of the host i entry. The storage controller then looks-up (at block 106) the LUN number entry in the LUN map 60i of the LUN included in the CDB of the access request to determine (at block 108) whether there is a valid logical disk number associated with the looked-up LUN entry, indicating that the LUN the host i wants to access is a valid LUN number to that host i. If there is not a specified logical disk for the listed LUN number entry, then the storage controller returns (at block 110) an error message to the host i indicating that access is not permitted to the requested LUN. Otherwise, if there is a valid logical disk number associated with the looked-up LUN number entry, then the storage controller executes the requested I/O request, e.g., read/write request, against the storage device 14 at the logical disk associated with the LUN included in the CDB block.

The port ID map 70 is the primary data structure the storage controller accesses when processing I/O requests. The storage controller processes the cluster group objects 30, master logical disk list 40, host LUN map 80, and associated LUN maps 60 when adding or removing a logical disk from a cluster group to ensure that a unique LUN number is provided for all hosts that have access to that LUN, i.e., the same LUN number is not assigned to two or more logical disks that may be accessed by a group of hosts. An invalid state would exist if the same LUN number was assigned to multiple logical disks, such that the same group of hosts would look at one LUN number that is assigned to multiple logical disks. However, it is possible that the same LUN number can be assigned to different logical disks that are accessed by different cluster groups of host computers as long as the LUN numbers accessible to hosts in one cluster group map to only one logical disk number. Hosts in a different cluster group may view the same LUN number used in another group because the LUN number may map to different logical disk numbers in different cluster groups, as long as the cluster groups using the same LUN number do not have any common host systems. In this way, preferred embodiments optimize the use of LUN numbers by allowing the same LUN number to be used in different cluster groups for different logical disk assignments. This is particularly important because many operating systems provide for only a limited number of possible LUN numbers, e.g., 64 different LUN numbers. Further, many operating systems want to use LUN 0 as the boot disk.

When the storage controller creates a logical disk, the configuration options available are to restrict access to the logical disk by assigning it to a cluster group or designate the logical disk public so that all hosts can access the logical disk without restriction. A logical disk assigned to a cluster group can be removed from the cluster group and made publicly available. A public logical disk can be restricted by assigning the logical disk to a cluster group. Further, as discussed, LUN 0 is preferably reserved for the boot disk of a particular operating system.

FIGS. 4–9 illustrate logic implemented in the storage controller to assign a logical disk to a cluster group to restrict access to the logical disk to those hosts assigned to the cluster group. This logic ensures that a LUN number is assigned to the logical disk assigned for that cluster group in a manner that does not conflict with any other LUN numbers that the hosts in the cluster group can access. With respect to FIG. 4, control begins at block 200 with the storage controller receiving as input a logical disk number and cluster group number to which the input logical disk number will be assigned so that only those hosts in the input cluster group number can access the input logical disk number. The storage controller looks-up (at block 202) the input logical disk number entry in the master logic disk list 40. The storage controller determines (at block 204) whether the input logical disk number is currently publicly availably by determining whether the looked-up entry for the input logical disk number has a valid LUN number and an invalid cluster number. If the input logical disk is publicly accessible, then control proceeds to block 250 in FIG. 5 to assign the input logical disk number to the input cluster group number so that hosts that are members of the input cluster group can continue accessing the input logical disk using the current assigned LUN number. However, those hosts that are not members of the input cluster group can no longer access the previously public input logical disk. The logic at block 250 in FIG. 5 updates information in the master logical disk list 40 and host LUN maps 60*i* of hosts i so that hosts that are members of the input cluster group can continue accessing the input logical disk and hosts that are not members of the input cluster group cannot access the input logical disk.

Figure 5:
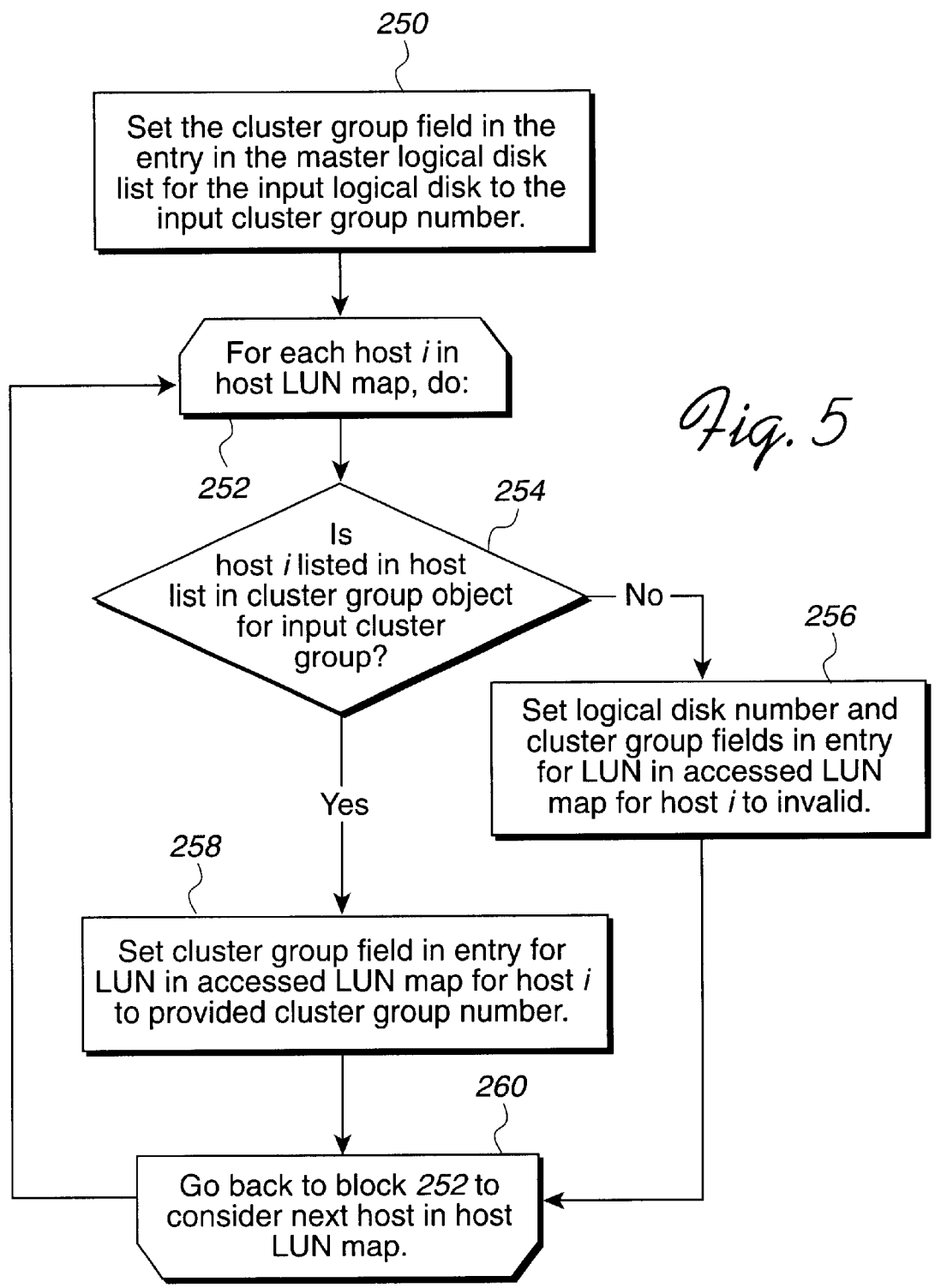
Figure 6:
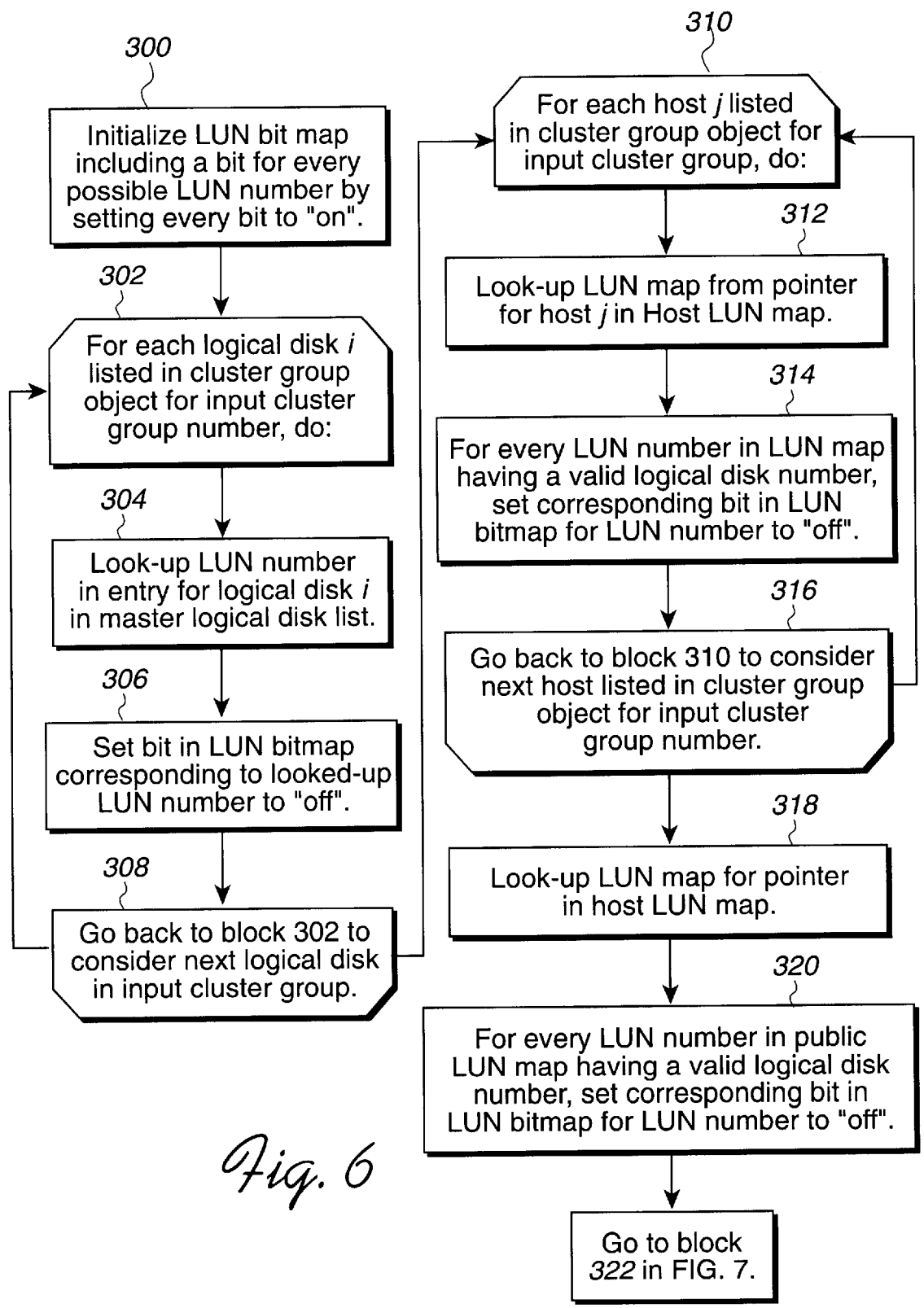
Figure 7:
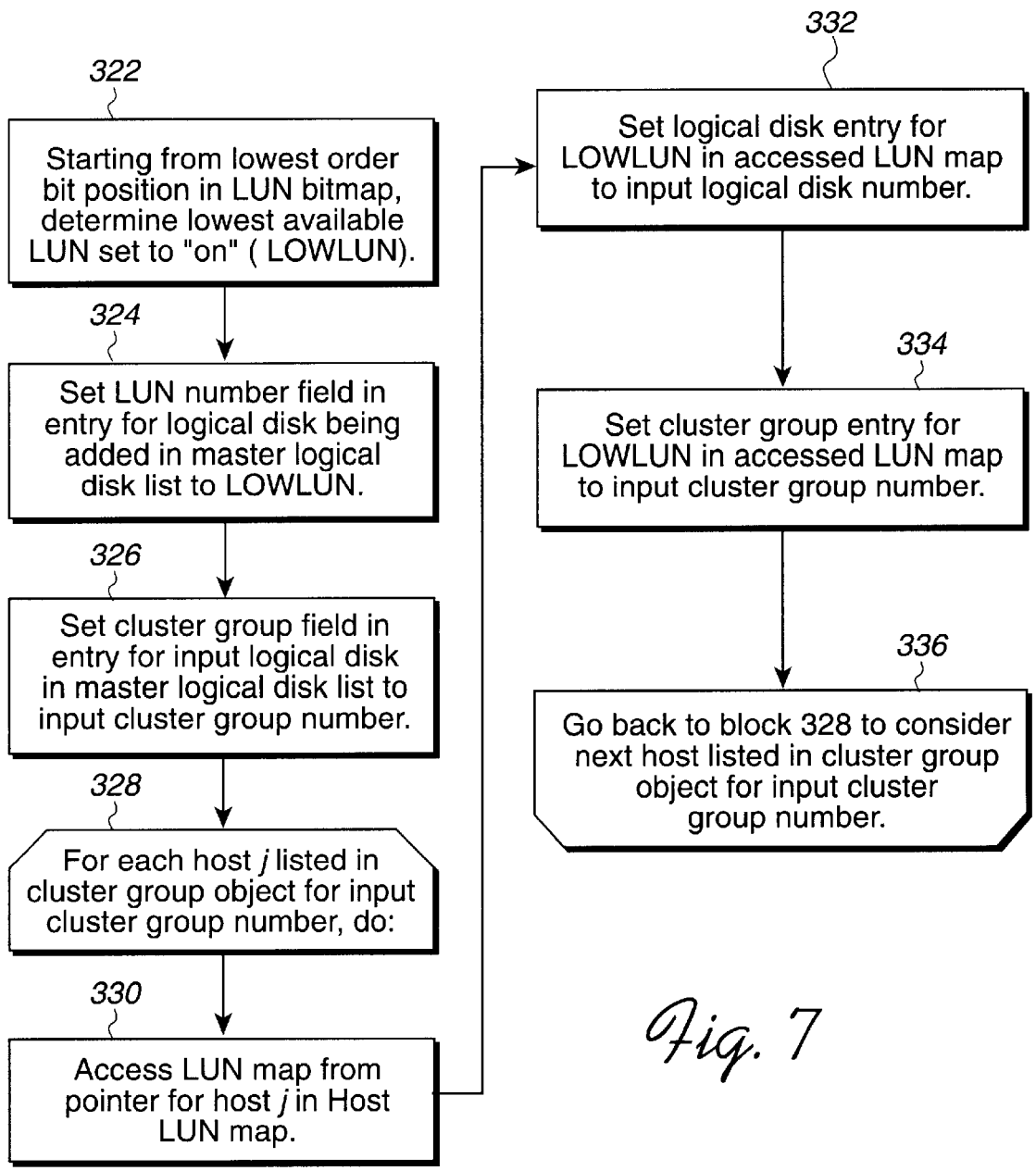

With respect to FIG. 5 at block 250, the storage controller sets the cluster group field entry 44 in the master logical disk list 40 to the input cluster group number. At block 252, a loop begins to update the LUN map 60*i* for each host i in the input cluster group to indicate that the LUN number of the input logical disk, as indicated in the master logical disk list 40, is part of the input cluster group. For each host i indicated in the host field 52 of the host LUN map directory 50, the storage controller determines (at block 254) whether host i is assigned to the input cluster group by examining the list of hosts 34 in the cluster group object 30 for the input cluster group number. If the host i is not assigned to the input cluster group, then the storage controller sets (at block 256) the logical disk number field 64 and cluster group field 66 in the entry for the LUN of the input logical disk in the LUN map 60 to invalid as this host i can no longer access the input logical disk. The storage controller accesses the LUN map 60 for a host i through the host LUN map directory 50 which provides pointers 54 to the LUN map 60*i* for the listed hosts i 52. Otherwise, if the host i is assigned to the input cluster group to which the input logical disk is reassigned, then the storage controller sets (at block 258) the cluster group field 66 in the entry for the LUN of the input logical disk in the accessed LUN map 60*i* to the input cluster group so that the host i can continue to access the input logical disk using its current assigned LUN number as indicated in the master logical disk list 40. However, hosts that are not members of the input cluster group can no longer access that input logical disk number as the LUN maps for those host no longer map a LUN number to the input logical disk. After updating the fields in the host LUN maps 60*i*, control proceeds (at block 260) to update the LUN maps 60(*i* +1) for any further hosts (i+1) listed in the host LUN map directory 50 not yet considered.

If, at block 204, the storage controller determines that the input logical disk is not currently mapped to a LUN, or is currently assigned to a cluster group (i.e., has a valid LUN and cluster group number), then the storage controller determines (at block 206) whether the entry for the input logical disk in the master logical disk list 40 has an input LUN number, i.e., the input logical disk has not been assigned a LUN number. If input logical disk has an invalid LUN number, then control proceeds to block 300 in FIG. 6 to assign the input logical disk a LUN number that is unique to all hosts in the input cluster group. Moreover, to optimize the use of available LUN numbers, the storage controller further determines the lowest available LUN number that is not currently used by any host in the input cluster group or is public. To accomplish this task of assigning the lowest available LUN number, control begins at block 300 in FIG. 6 with the storage controller initializing a LUN bitmap (not shown) including a bit for every possible LUN number and setting each bit to "on", i.e., binary one. In certain implementations, the lowest order bit in the LUN bitmap corresponds to LUN number 0, with each next order bit corresponding to the next LUN number. The storage controller will then systematically reset those bits corresponding to LUN numbers that are currently accessible to any host in the input cluster group or are public, so that all remaining "on" bits in the LUN bitmap correspond to LUN numbers that are not currently used by any host in the input cluster group.

From blocks 302 to 308, the storage controller performs a loop of blocks 304 and 306 for each logical disk i in the input cluster group (as identified in the list 36 of logical disks in the cluster group object 30 for the input cluster group number) to ensure that no LUN number currently assigned to a logical disk in the input cluster group is assigned to the input logical disk. At block 304, the storage controller looks-up (at block 304) the LUN number 42 in the entry for logical disk i in the master logical disk list 40 and then sets (at block 306) the bit in the LUN bitmap corresponding to the looked-up LUN number to "off".

From blocks 310 to 316, the storage controller performs a loop of blocks 312 and 314 for each host j that is a member of the input cluster group (as identified in the list 34 of hosts in the cluster group object 30 for the input cluster group number) to ensure that no LUN number that is currently used by a host in the input cluster group is assigned to the input logical disk. This process requires the storage controller to consider the LUNs in other cluster groups that the hosts of the input cluster group can access. At block 312, the storage controller looks-up the LUN map 60*j* for host j from the pointer in the pointer field 56 in the entry for host j in the host LUN map directory 50. The storage controller then sets (at block 314) every bit in the LUN bitmap to "off" that corresponds to a LUN number entry in host j's LUN map 60*j* that has a valid logical disk number 64; a valid logical disk number means that the host j uses the corresponding LUN number to access the valid logical disk number.

The storage controller then looks-up (at block 318) the public LUN map 60 using the pointer in the public pointer 56 in the host LUN map directory 50. For every LUN number entry in the public LUN map having a valid logical disk number 64, the storage controller sets (at block 320) the bit corresponding to the LUN number in the LUN bitmap to "off." Thus, blocks 318 and 320 ensure that no LUN numbers assigned to publicly accessible logical disks, which all hosts can access, are used for the input logical disk.

After resetting the bits in the LUN bitmap corresponding to all LUN numbers that can be used by the logical disks that are members of the input cluster group, the storage controller then starts (at block 322 in FIG. 7) from the lowest order bit in the LUN bitmap, corresponding to the lowest possible LUN number (LUN 0), and then determines LOWLUN, which is the lowest LUN number having a bit value of "on". The storage controller then sets (at block 324) the LUN number field 42 in the entry for the input logical disk in the master logical disk list 40 to LOWLUN and sets (at block 326) the cluster group field 44 in the entry for the input logical disk in the master logical disk list 40 to the input cluster group number.

From blocks 328 to 336, the storage controller performs a loop of blocks 330, 332, and 334 to update the LUN map 60j for each host j in the input cluster group to reflect the new input logical disk and input cluster group for the LUN number (LOWLUN) assigned to the input logical disk. At block 330, the storage controller accesses the LUN map 60j for host j from the pointer in the LUN map pointer field 56 for the host j entry in the host LUN map directory 50. For the LOWLUN entry in the LUN map 60j, the storage controller sets (at block 332) the logical disk number field 64 to the input logical disk number and sets (at block 334) the cluster group field 66 to the input cluster group number.

If the storage controller determined (at block 204) that the input logical disk is not currently publicly accessible and determined (at block 206) that the looked-up entry for the input logical disk number in the master logical disk list 40 has a valid LUN number, then the input logical disk is currently assigned to a cluster group. In such case, to reassign the input logical disk to the new input cluster group number, the storage controller must first make the input logical disk publicly available at block 208 and then reassign the input logical disk to the input cluster group by proceeding to block 450 in FIG. 9.

Figure 8:
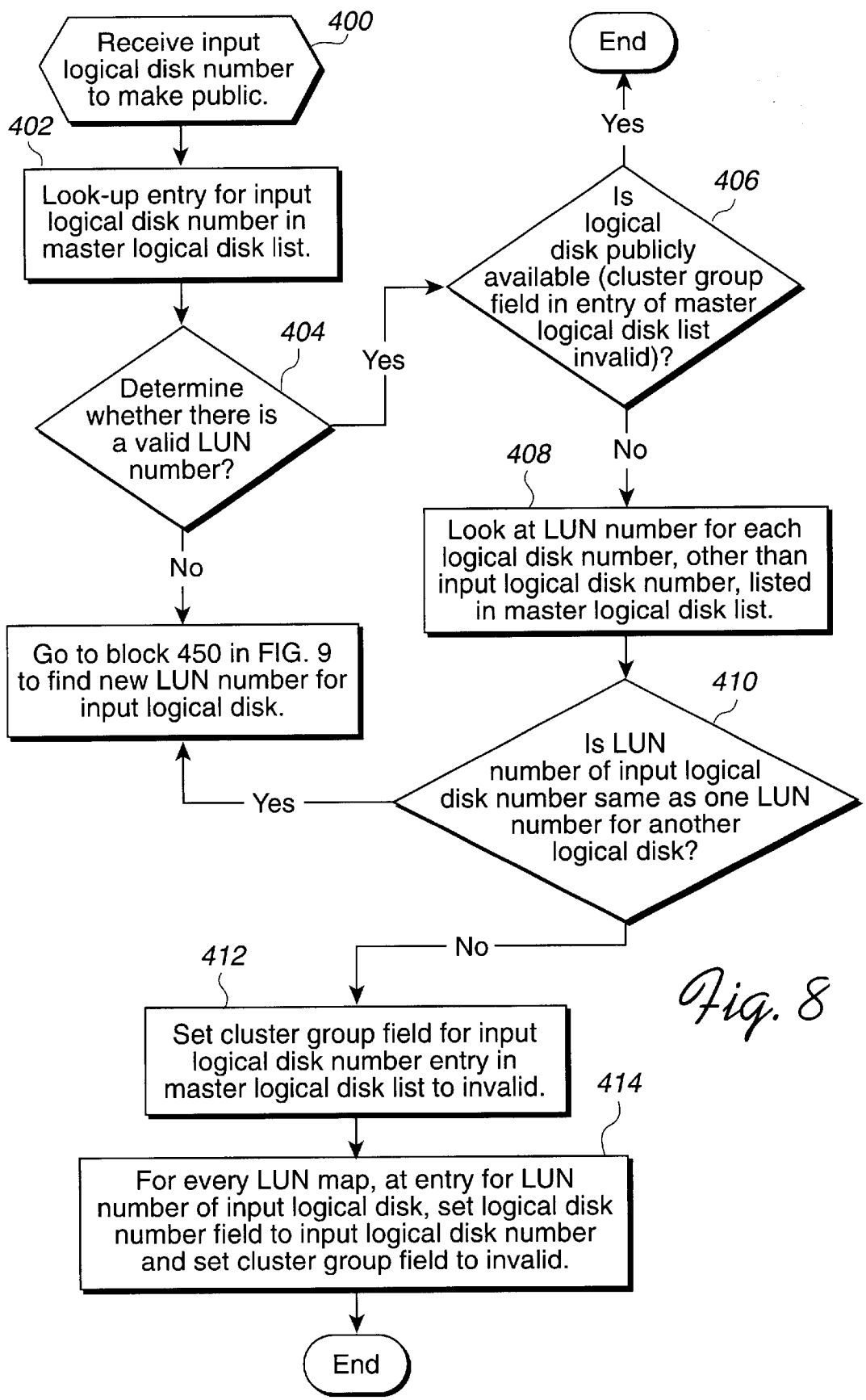

FIG. 8 illustrates logic to make a logical disk currently assigned to a cluster group publicly available. The storage controller may use the logic of FIG. 8 within the logic of FIG. 4 when reassigning the input logical disk to a new cluster group or as part of a stand alone operation to make a logical disk currently assigned to a cluster group publicly available. The routine of FIG. 8 begins at block 400 and requires as input the logical disk to make publicly available. At block 402, the storage controller looks-up the entry for the input logical disk number in the master logical disk list 40 and determines (at block 404) whether there is a valid LUN number in field 42. If so, the storage controller determines whether the input logical disk is publicly available by determining whether the cluster group field 44 for the input logical disk entry is invalid, i.e., the input logical disk is not assigned to a cluster group. If so, then the logic ends as the input logical disk is already publicly available. (Note that the decision at block 406 is used in the event the logic of FIG. 8 is executed to make a logical disk publicly available outside of the context of the logic of FIG. 4).

Otherwise, if the logical disk is not already publicly available, then the storage controller needs to determine whether the input logical disk to make public uses a LUN number that is not used in another cluster group. Again, the storage controller must ensure that the logical disk being made public uses or is assigned a LUN number that is not used in any cluster group, otherwise hosts in that cluster group would then use the same LUN number for different logical disks, which would result in an invalid state. To ensure LUN number integrity, the storage controller looks (at block 408) at the LUN number in field 42 for each logical disk, other than the input logical disk, in the master logical disk list 40. If (at block 410) the LUN number currently assigned to the input logical disk is the not same as one of the LUN numbers in field 42 for other logical disks, then the current LUN number of the input logical disk can be used. In such case, the storage controller sets (at block 412) the cluster group field 44 for the input logical disk entry in the master logical disk list 40 to invalid. Further, at the entry for the LUN number of the input logical disk in every LUN 60i map (for every host i identified in the host LUN map directory 50 and the public LUN map), the storage controller sets the logical disk number field 64 to the input logical disk number and sets the cluster group field 66 to invalid or NULL. This associates the input logical disk with its current LUN number in every LUN map 60i and the public LUN map and indicates that the logical disk is public by making the cluster group field 66 invalid.

Figure 9:
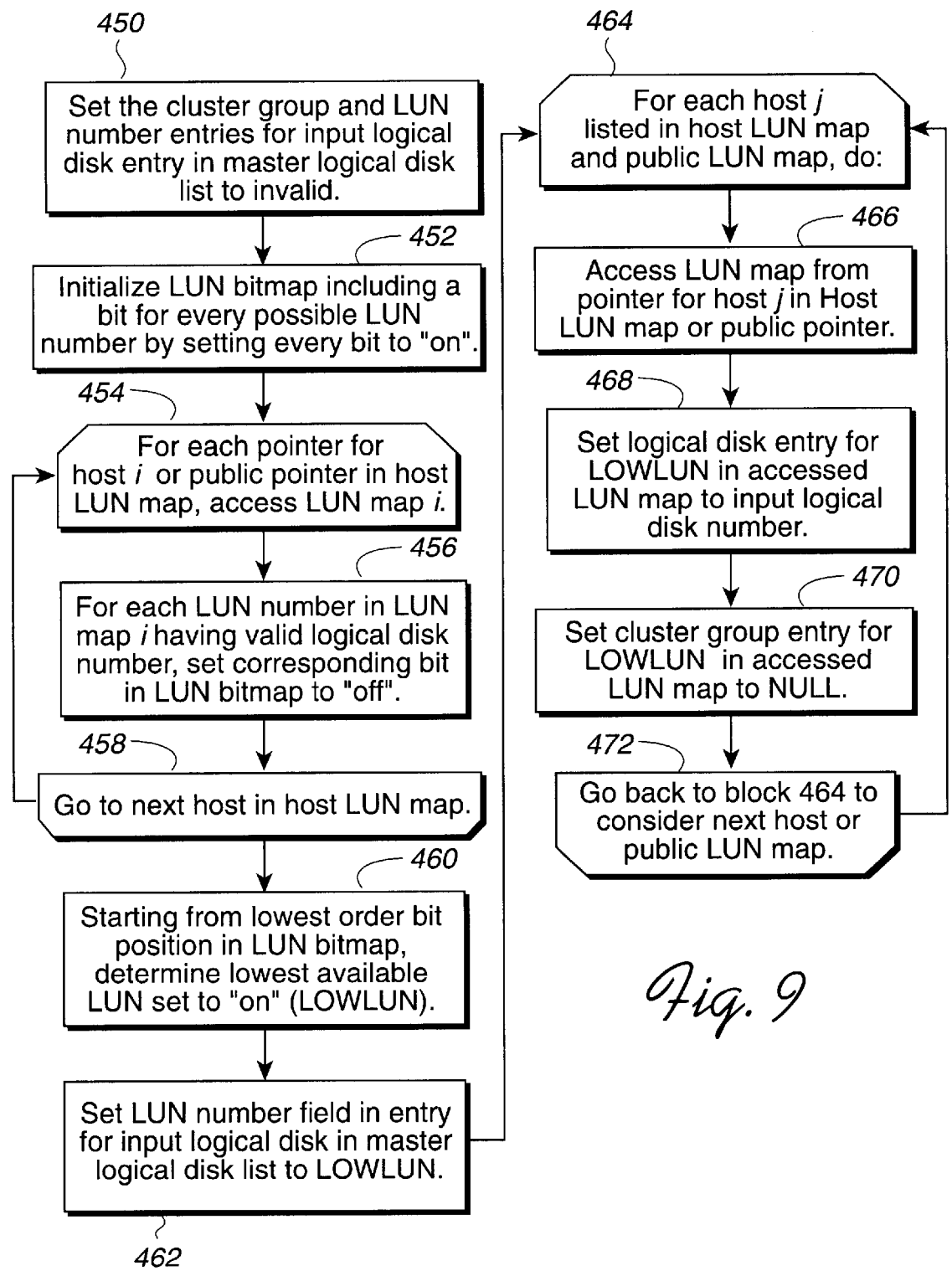

If the logical disk to make public does not have a valid LUN number or if its current LUN number is used in a cluster group that does not include the input logical disk, then the storage controller executes the logic in FIG. 9 to reassign the input logical disk a new LUN number that is currently not used by any other host. With respect to FIG. 9, control begins at block 450 with the storage controller setting the cluster group 44 and LUN number 42 fields in the entry for the input logical disk in the master logical disk list to invalid to indicate that the input logical disk is no longer assigned its current LUN number or part of a cluster group. The storage controller then initializes (at block 452) the LUN bitmap by setting every bit to "on", where there is a bit for every possible LUN number.

For blocks 454–458, the storage controller performs a loop of block 456 to reset the bit in the LUN bitmap to "off" for every LUN number that is currently accessible to any host. For each pointer 54 in the host LUN map directory 50 for every listed host i and the public pointer, the storage controller goes through the corresponding LUN map 60i. For every valid LUN number in every LUN map 60i and the public LUN map, the storage controller sets the corresponding bit in the LUN bitmap to "off", thus indicating all currently used LUN numbers. The storage controller then selects (at block 460 and 462) the lowest unused LUN number (LOWLUN) and sets LUN number field 42 in the entry for the input logical disk in master logical disk list 40 to LOWLUN. The storage controller then (at blocks 464–472) updates every host i LUN map 60 and the public LUN map to indicate that the LOWLUN number is used for the input logical disk, and that such LUN number is not part of cluster group by updating the logical disk number 64 (at block 468) and the cluster group 66 (at block 470) fields. After this operation, every host may access the input logical disk using the LOWLUN LUN number.

The storage controller uses the logic of FIGS. 5–9 to use cluster groups to restrict access to certain logical disks to certain hosts and to optimize the use of LUN numbers by allowing the same LUN number to be reused in different cluster groups. However, when adding a logical disk to a cluster group or making a logical disk available to all hosts, the storage controller must ensure that the LUN number used by such logical disk is not the same as a LUN number currently used in a cluster group for a different logical disk; otherwise an invalid condition would arise where one or more hosts could view the same LUN number assigned to two different logical disks.

FIGS. 10–14 illustrate examples of how the data structures 40 and 60 may change in accordance with the logic of FIGS. 5–9 as changes are made to the cluster groups.

FIG. 10 shows the initial state, where there are logical disks LD0, LD1, LD2, and LD3 that do not have assigned LUN numbers 0, 1, 2, 3. The master logical disk list 500 and public LUN map 502 reflect this initial state.

FIG. 11 illustrates the next state where cluster group CG0 is created to include host 0 (HO) and logical disk LD0. The master logical disk list 510 is updated to reflect that logical disk 0 is now in CG0 and the host 0 LUN map 514 is updated to reflect that logical disk 0 LD0 is part of cluster group CG0.

FIG. 12 illustrates a state where cluster group 1 (CG1) is created to include host 1 (HI) and logical disks 1 and 2 (LD1 and LD2). The assignment of logical disks LD1 and LD2 to cluster group CG1 will make those logical disks invalid in the public LUN map 522 as they are no longer publicly accessible. Because logical disk 1 (LD1) and logical disk 0 (LD) are in separate cluster groups, they may both have the same LUN number.

The host 1 LUN map 526 is updated to assign LUN numbers 0 and 1 to logical disks 1 and 2, which are in cluster group CGl. However, the host 1 LUN map 526 does not include an entry for logical disk 0 (LD0) because that is part of a different cluster group (CG0), which is not accessible to host 1 and other members of cluster group (CG1).

Figure 13:
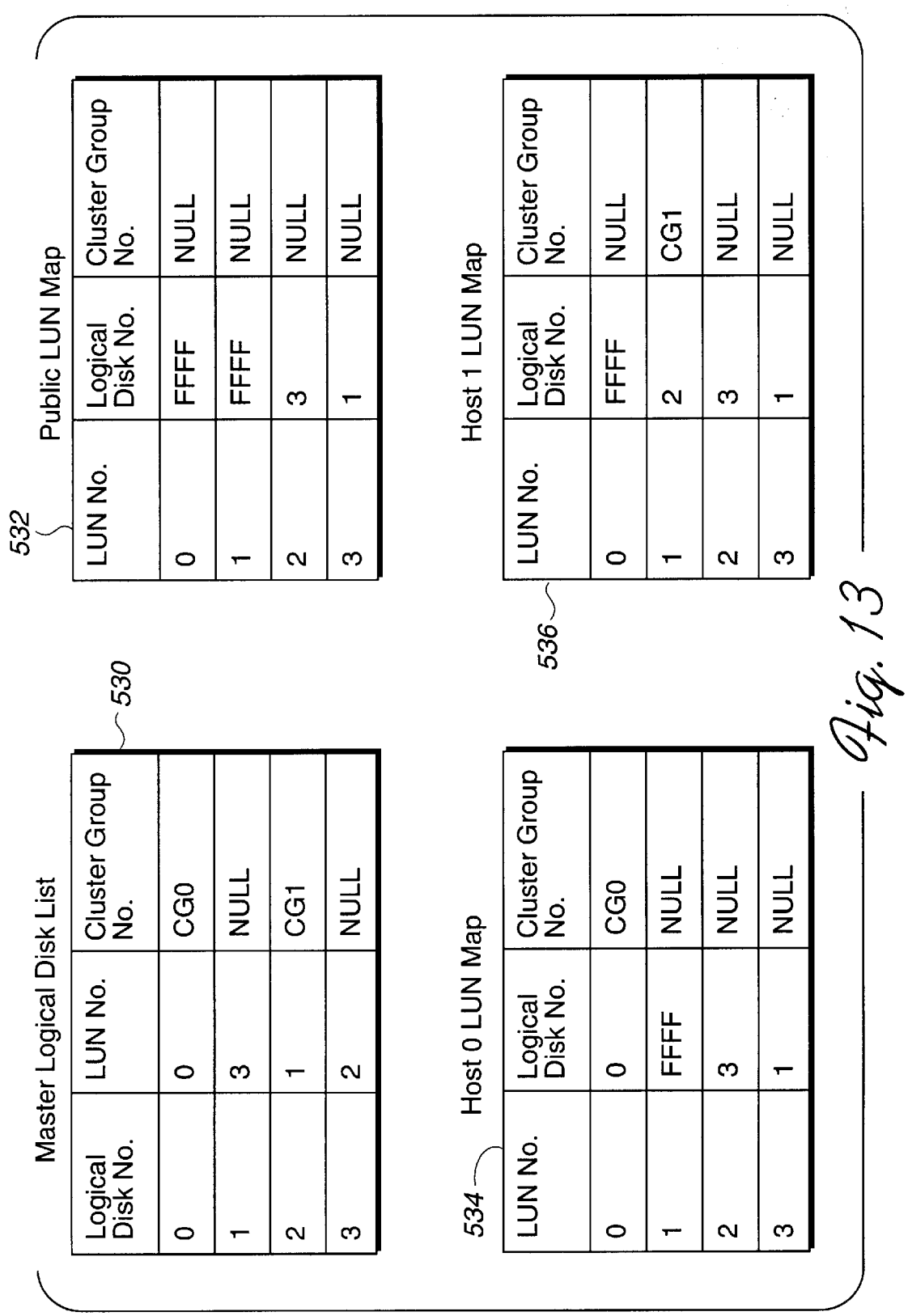

FIG. 13 illustrates the state where logical disk 1 (LD1) is removed from cluster group 1 (CG1) and made public and logical disk 3 is mapped to logical LUN number 3. To make logical disk 1 (LD1) public, it must be reassigned an unused LUN number as its current assigned LUN number 0 in cluster group 1 (CG1) is already used for logical disk 0 (LD0) in cluster group 0 (CG0). As can be seen from the master logical disk list 520 in the previous state of FIG. 12, the lowest unused LUN number is 3. For this reason, the master logical disk list 530 is updated to reflect the remapping of public logical disk 1 to LUN number 3. The public LUN map 532 is updated to reflect that logical disk 1 (LD1) is available and maps to LUN number 3. The host 0 LUN map 534 is updated to reflect that host 0 can use LUN number 3 can to access logical disk 1 (LD1). The host 1 LUN map 536 is updated to reflect that there is no cluster group for LUN number 3 and logical disk 1 (LD1) as logical disk 1 (LD1) is now public.

FIG. 14 illustrates the next state where logical disk 3 (LD3) is moved to cluster group 0 (CG0). The master logical disk list 540 is updated to reflect that logical disk 3 (LD3) is now in cluster group 0 (CG0). The public LUN map 542 is updated to reflect that logical disk 3 (LD3) is no longer publicly available by making invalid the logical disk field that previously included logical disk 3 (LD3). The host 0 LUN map 544 is updated to reflect that host 0 can still use LUN 2 to access logical disk 3, which is now in cluster group 0 (CG0). Finally, the host 1 LUN map 546 is updated to remove the reference to logical disk 3 (LD3) at the LUN 2 entry as host 1 can no longer access logical disk 3 (LD3) as host 1 is not a member of cluster group 0 (CG0).

Conclusion

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

In preferred embodiments, the data structures used by the storage controller to maintain cluster groups and information thereon is maintained in storage controller memory or storage. In alternative embodiments, the storage controller may maintain the data structures 30, 40, 50, 60, and 70 in one or more host memories or storage.

The preferred logic of FIGS. 4–9 described specific operations occurring in a particular order. In alternative embodiments, certain of the logic operations may be performed in a different order, modified or removed and still implement preferred embodiments of the present invention. Morever, steps may be added to the above described logic and still conform to the preferred embodiments.

As discussed the term logical disk or logical device referred to herein refers to the physical disk or device to which the storage controller maps to a LUN. The storage controller then performs operations directly with respect to the logical disk or logical device. If the logical device corresponds to a DASD, then there may be a direct one-to-one mapping from the logical disk to the DASD. Alternatively, if the logical device corresponds to a portion of a RAID array, then the storage controller may need to perform further mapping operations to determine the actual physical locations in the RAID array corresponding to the logical disk (or logical device). In still further embodiments, the logical device may correspond to non-volatile storage other than disk drives, such as tape drives, optical disks, etc.

In summary, preferred embodiments disclose a method, system, program, and data structure for restricting host access to at least one logical device. Each logical device comprises a section of physical storage space that is non-overlapping with the physical storage space associated with other logical devices. At least one logical device and at least one host are assigned to a cluster group. A cluster group is defined such that hosts that are not in a particular cluster group cannot access the logical devices that are assigned to the cluster group. Further, within each cluster group, a logical number is assigned to each logical device in the cluster group such that no host member of that cluster group uses the assigned logical number to access another logical device. The hosts in the cluster group use the logical number to access the logical device to which the logical number is assigned.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claim is:

1. A method for restricting host access to at least one logical device, wherein each logical device comprises a section of physical storage space that is non-overlapping with the physical storage space associated with other logical devices, comprising:

for each cluster group, assigning at least one logical device and at least one host to the cluster group, wherein hosts that are not assigned to the cluster group cannot access the logical devices that are assigned to the cluster group;

for each cluster group, assigning a logical number to each logical device in the cluster group such that the at least one host assigned to the cluster group does not use the assigned logical number to access a logical device other than the logical device assigned to the logical number, wherein the at least one host assigned to the cluster group uses the logical number to access the logical device to which the logical number is assigned in the cluster group, wherein a host list indicates all available hosts and wherein all hosts in the host list can access a logical device assigned one logical number and not assigned to a cluster group, and wherein for each host in the host list there is a host map indicating each logical number accessible to the host;

receiving a request, including as parameters one input logical device and input cluster group, to add the input logical device to the input cluster group;

determining whether the input logical device is accessible to all hosts; and updating the host map for each host that is not assigned to the input cluster group to indicate that the input logical device is not accessible if the input logical device is accessible to all hosts.

2. The method of claim 1, wherein a logical device is only capable of being a member assigned to one cluster group.

3. The method of claim 1, further comprising:

receiving an access request including as parameters one input logical number from one host;

determining whether the host is capable of accessing one logical device associated with the input logical number; and permitting the host access to the logical device associated with the input logical number if there is a logical device associated with the input logical number.

4. The method of claim 1, further comprising:

updating the host map for each host that is assigned to the input cluster group to indicate that a logical number assigned to the input logical device is included in the input cluster group if the input logical device is accessible to all hosts.

5. The method of claim 1, wherein a logical device is a member of a set of storage spaces comprising one of multiple direct access storage devices and a portion of a RAID array.

6. The method of claim 1, wherein logical numbers used in different cluster groups are capable of being assigned to different logical devices.

7. A method for restricting host access to at least one logical device, wherein each logical device comprises a section of physical storage space that is non-overlapping with the physical storage space associated with other logical devices, comprising:

for each cluster group, assigning at least one logical device and at least one host to the cluster group, wherein hosts that are not in the cluster group cannot access the logical devices that are assigned to the cluster group;

for each cluster group, assigning a logical number to each logical device in the cluster group such that no host member of that cluster group uses the assigned logical number to access another logical device, wherein hosts in the cluster group use the logical number to access the logical device to which the logical number is assigned in the cluster group;

providing a host list indicating all available hosts, wherein all hosts in the host list can access a logical device assigned one logical number and not assigned to a cluster group, and wherein for each host in the host list there is a host map indicating each logical number accessible to the host;

receiving a request, including as parameters one input logical device and input cluster group, to add the input logical device to the input cluster group;

determining whether the input logical device is not assigned one logical number;

if the input logical device is not assigned one logical number, further performing:

(i) determining one logical number that is not used by any host assigned to the input cluster group to access one logical device by determining a lowest logical number that is not used by any host assigned to the input cluster group to access one logical device;

(ii) assigning the determined logical number to the input logical device; and (iii) updating the host map for each host that is assigned to the input cluster group to indicate that the determined logical number is assigned to the input logical device, wherein after the host maps are updated, each host in the input cluster group can use the determined logical number to access the input logical device.

8. A method for restricting host access to at least one logical device, wherein each logical device comprises a section of physical storage space that is non-overlapping with the physical storage space associated with other logical devices, comprising:

for each cluster group, assigning at least one logical device and at least one host to the cluster group, wherein hosts that are not in the cluster group cannot access the logical devices that are assigned to the cluster group;

for each cluster group, assigning a logical number to each logical device in the cluster group such that no host member of that cluster group uses the assigned logical number to access another logical device, wherein hosts in the cluster group use the logical number to access the logical device to which the logical number is assigned in the cluster group;

providing a host list indicating all available hosts, wherein all hosts in the host list can access a logical device assigned one logical number and not assigned to a cluster group, wherein for each host in the host list there is a host map indicating each logical number accessible to the host;

receiving a request including as a parameter one input logical device to make accessible to all hosts in the host list;

determining one cluster group including the input logical device;

determining the logical number for the input logical device;

determining whether any host that is not in the determined cluster group including the input logical device uses the determined logical number for the input logical device to access one logical device other than the input logical device; and updating the host map for each host in the host list to indicate that the determined logical number is assigned to the input logical device if no other host that is not in the determined cluster group uses the determined logical number, wherein after updating the host map for each host in the host list, all the hosts in the host list can use the determined logical number to access the input logical device.

9. The method of claim 8, wherein if at least one host that is not in the determined cluster group uses the determined logical number, then further performing:

determining one unused logical number that is not used by any host in the host list to access one logical device; and updating the host map for each host in the host list to indicate that the determined unused logical number is assigned to the input logical device, wherein all the hosts in the host list can use the determined unused logical number to access the input logical device.

10. A system for restricting host access to at least one logical device, wherein each logical device comprises a section of physical storage space that is non-overlapping with the physical storage space associated with other logical devices, comprising:

means for assigning at least one logical device and at least one host to at least one cluster group, wherein hosts that are not assigned to one cluster group cannot access the logical devices that are assigned to the cluster group, and wherein multiple hosts are capable of being assigned to one cluster group;

means for assigning a logical number to at least one logical device in the at least one cluster group such that the at least one host assigned to one cluster group does not use the assigned logical number to access another logical device, wherein the at least one host assigned to one cluster group uses the logical number to access the logical device to which the logical number is assigned in the cluster group, wherein a host list indicates all available hosts and wherein all hosts in the host list can access a logical device assigned one logical number and not assigned to a cluster group and wherein for each host in the host list there is a host map indicating each logical number accessible to the host;

means for receiving a request, including as parameters one input logical device and input cluster group, to add the input logical device to the input cluster group;

means for determining whether the input logical device is accessible to all hosts; and means for updating the host map for each host in one host list that is not assigned to the input cluster group to indicate that the input logical device is not accessible if the input logical device is accessible to all hosts.

11. The system of claim 10, wherein a logical device is only capable of being a member assigned to one cluster group.

12. The system of claim 10, further comprising:

means for receiving an access request including as parameters one input logical number from one host;

means for determining whether the host is capable of accessing one logical device associated with the input logical number; and means for permitting the host access to the logical device associated with the input logical number if there is a logical device associated with the input logical number.

13. The system of claim 10, further comprising:

means for updating the host map for each host that is assigned to the input cluster group to indicate that a logical number assigned to the input logical device is included in the input cluster group if the input logical device is accessible to all hosts.

14. The system of claim 10, wherein a logical device is a member of a set of storage spaces comprising one of multiple direct access storage devices and a portion of a RAID array.

15. The system of claim 10, wherein logical numbers used in different cluster groups are capable of being assigned to different logical devices.

16. A system for restricting host access to at least one logical device, wherein each logical device comprises a section of physical storage space that is non-overlapping with the physical storage space associated with other logical devices, and wherein each logical device has a logical device number, comprising:

means for assigning at least one logical device and at least one host to at least one cluster group, wherein hosts that are not assigned to one cluster group cannot access the logical devices that are assigned to the cluster group;

means for assigning a logical number to at least one logical device in the at least one cluster group such that the at least one host assigned to one cluster group does not use the assigned logical number to access another logical device, wherein the at least one host in one cluster group uses the assigned logical number to access the logical device to which the logical number is assigned in the cluster group;

means for providing a host list indicates all available hosts, wherein all hosts in the host list can access a logical device assigned one logical number and not assigned to a cluster group, wherein for each host in the host list there is a host map indicating each logical number accessible to the host;

means for receiving a request, including as parameters one input logical device and input cluster group, to add the input logical device to the input cluster group;

means for determining whether the input logical device is not assigned one logical number; and means for performing if the input logical device is not assigned one logical number:

(i) determining one logical number that is not used by any host assigned to the input cluster group to access one logical device by determining a lowest logical number that is not used by any host assigned to the input cluster group to access one logical device;

(ii) assigning the determined logical number to the input logical device; and (iii) updating the host map for each host that is assigned to the input cluster group to indicate that the determined logical number is assigned to the input logical device, wherein after the host maps are updated, each host in the input cluster group can use the determined logical number to access the input logical device.

17. A system for restricting host access to at least one logical device, wherein each logical device comprises a section of physical storage space that is non-overlapping with the physical storage space associated with other logical devices, and wherein each logical device has a logical device number, comprising:

means for assigning at least one logical device and at least one host to at least one cluster group, wherein hosts that are not assigned to one cluster group cannot access the logical devices that are assigned to the cluster group;

means for assigning a logical number to at least one logical device in the at least one cluster group such that the at least one host assigned to one cluster group does not use the assigned logical number to access another logical device, wherein the at least one host in one cluster group uses the assigned logical number to access the logical device to which the logical number is assigned in the cluster group;

means for providing a host list indicating all available hosts, wherein all hosts in the host list can access a logical device assigned one logical number and not assigned to a cluster group, wherein for each host in the host list there is a host map indicating each logical number accessible to the host;

means for receiving a request including as a parameter one input logical device to make accessible to all hosts in the host list;

means for determining one cluster group including the input logical device;

means for determining the logical number for the input logical device;

means for determining whether any host that is not in the determined cluster group including the input logical device uses the determined logical number for the input logical device to access another logical device; and means for updating the host map for each host in the host list to indicate that the determined logical number is assigned to the input logical device if no other host that is not in the determined cluster group uses the determined logical number, wherein after updating the host maps all the hosts in the host list can use the determined logical number to access the input logical device.

18. The system of claim 17, wherein if at least one host that is not in the determined cluster group uses the determined logical number, then further comprising:

means for determining one unused logical number that is not used by any host in the host list to access one logical device; and means for updating the host map for each host in the host list to indicate that the determined unused logical number is assigned to the input logical device, wherein all the hosts in the host list can use the determined unused logical number to access the input logical device.

19. An article of manufacture for use in restricting host access to at least one logical device, wherein each logical device comprises a section of physical storage space that is non-overlapping with the physical storage space associated with other logical devices, the article of manufacture capable of causing a server controlling access to the physical storage space in communication with the hosts to perform:

for each cluster group, assigning at least one logical device and at least one host to the cluster group, wherein hosts that are not assigned to the cluster group cannot access the at least one logical device assigned to the cluster group;

for each cluster group, assigning a logical number to each logical device in the cluster group such that the at last one host assigned to the cluster group does not use the assigned logical number to access a logical device other than the logical device assigned to the logical number, wherein the at least one host assigned to the cluster group uses the logical number to access the logical device to which the logical number is assigned in the cluster group, wherein a host list indicates all available hosts and wherein all hosts in the host list can access a logical device assigned one logical number and not assigned to a cluster group, and wherein for each host in the host list there is a host map indicating each logical number accessible to the host;

receiving a request, including as parameters one input logical device and input cluster group, to add the input logical device to the input cluster group;

determining whether the input logical device is accessible to all hosts; and updating the host map for each host that is not assigned to the input cluster group to indicate that the input logical device is not accessible if the input logical device is accessible to all hosts.

20. The article of manufacture of claim 19, wherein a logical device is only capable of being a member assigned to one cluster group.

21. The article of manufacture of claim 19, further comprising:

receiving an access request including as parameters one input logical number from one host;

determining whether the host is capable of accessing one logical device associated with the input logical number; and permitting the host access to the logical device associated with the input logical number if there is a logical device associated with the input logical number.

22. The article of manufacture of claim 19, further comprising:

updating the host map for each host that is assigned to the input cluster group to indicate that a logical number assigned to the input logical device is included in the input cluster group if the input logical device is accessible to all hosts.

23. The article of manufacture of claim 19, wherein a logical device is a member of a set of storage spaces comprising one of multiple direct access storage devices and a portion of a RAID array.

24. The article of manufacture of claim 19, wherein logical numbers used in different cluster groups are capable of being assigned to different logical devices.

25. An article of manufacture for use in restricting host access to at least one logical device, wherein each logical device comprises a section of physical storage space that is non-overlapping with the physical storage space associated with other logical devices, the article of manufacture capable of causing a server controlling access to the physical storage space in communication with the hosts to perform:

for each cluster group, assigning at least one logical device and at least one host to the cluster group, wherein hosts that are not assigned to the cluster group cannot access the at least one logical device assigned to the cluster group, and wherein multiple hosts are capable of being assigned to the cluster group;

for each cluster group, assigning a logical number to each logical device in the cluster group such that the at last one host assigned to the cluster group does not use the assigned logical number to access a logical device other than the logical device assigned to the logical number, and wherein the at least one host assigned to the cluster group uses the logical number to access the logical device to which the logical number is assigned in the cluster group, wherein a host list indicates all available hosts and wherein all hosts in the host list can access a logical device assigned one logical number and not assigned to a cluster group, and wherein for each host in the host list there is a host map indicating each logical number accessible to the host;

receiving a request, including as parameters one input logical device and input cluster group, to add the input logical device to the input cluster group;

determining whether the input logical device is not assigned one logical number;

if the input logical device is not assigned one logical number, further performing:
  (i) determining a lowest logical number that is not used by any host assigned to the input cluster group to access one logical device,
  (ii) assigning the determined logical number to the input logical device; and
  (iii) updating the host map for each host in the host list that is assigned to the input cluster group to indicate that the determined logical number is assigned to the input logical device, wherein after the host map for each host in the host list is updated, each host in the input cluster group can use the determined logical number to access the input logical device.

26. An article of manufacture for use in restricting host access to at least one logical device, wherein each logical device comprises a section of physical storage space that is non-overlapping with the physical storage space associated with other logical devices, the article of manufacture capable of causing a server controlling access to the physical storage space in communication with the hosts to perform:

for each cluster group, assigning at least one logical device and at least one host to the cluster group, wherein hosts that are not assigned to the cluster group cannot access the at least one logical device assigned to the cluster group;

for each cluster group, assigning a logical number to each logical device in the cluster group such that the at last one host assigned to the cluster group does not use the assigned logical number to access a logical device other than the logical device assigned to the logical number, and wherein the at least one host assigned to the cluster group uses the logical number to access the logical device to which the logical number is assigned in the cluster group, wherein for each host in the host list there is a host map indicating each logical number accessible to the host;

receiving a request including as a parameter one input logical device to make accessible to all hosts in the host list;

determining one cluster group including the input logical device;

determining the logical number for the input logical device;

determining whether any host that is not in the determined cluster group including the input logical device uses the determined logical number for the input logical device to access another logical device; and updating the host map for each host in the host list to indicate that the determined logical number is assigned to the input logical device if no other host that is not in the determined cluster group uses the determined logical number, wherein after updating the host maps all the hosts in the host list can use the determined logical number to access the input logical device.

27. The article of manufacture of claim 26, wherein if at least one host that is not in the determined cluster group uses the determined logical number, then further performing:

determining one unused logical number that is not used by any host in the host list to access one logical device; and updating the host map for each host in the host list to indicate that the determined unused logical number is assigned to the input logical device, wherein all the hosts in the host list can use the determined unused logical number to access the input logical device.

28. A computer-readable data transmission medium containing at least one data structure for restricting host access to at least one logical device, comprising:

information identifying a logical device and a section of physical storage space for the logical device such that the physical storage space is non-overlapping with physical storage space associated with other logical devices;

information identifying at least one logical device and at least one host assigned to at least one cluster group, wherein, for each cluster group, hosts that are not assigned to the cluster group cannot access the at least one logical device assigned to the cluster group;

information, for each cluster group, identifying a logical number assigned to the at least one logical device assigned to the cluster group such that the at least one host assigned to the cluster group does not use the assigned logical number to access another logical device, wherein the at least one host assigned to the cluster group uses the assigned logical number to access the logical device to which the logical number is assigned;

information identifying a host list indicating all available hosts, wherein all hosts in the host list can access a logical device assigned one logical number and not assigned to a cluster group; and information identifying for each host in the host list a host map indicating each logical number accessible to the host, wherein when one input logical device is added to one input cluster group, the host map for each host that is not assigned to the input cluster group is updated to indicate that the input logical device is not accessible if the input logical device is accessible to all hosts.

29. The computer readable transmission medium of claim 28, wherein a logical device is only capable of being a member assigned to one cluster group.

30. The computer readable transmission medium of claim 28, wherein the host map for each host that is assigned to the input cluster group is updated to indicate that the logical number assigned to the input logical device is included in the input cluster group if the input logical device is accessible to all hosts.

31. The computer readable medium of claim 28, wherein logical numbers used in different cluster groups are capable of being assigned to different logical devices.

* * * * *